United States Patent
Ochi et al.

(10) Patent No.: US 8,234,472 B2
(45) Date of Patent: Jul. 31, 2012

(54) STORAGE SYSTEM, STORAGE MANAGING DEVICE AND STORAGE MANAGING METHOD

(75) Inventors: Hiroaki Ochi, Kawasaki (JP); Tomoaki Tsuruta, Kawasaki (JP); Naohiro Takeda, Kawasaki (JP); Tsukasa Makino, Kawasaki (JP); Marie Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 12/631,191

(22) Filed: Dec. 4, 2009

(65) Prior Publication Data
US 2010/0153668 A1 Jun. 17, 2010

(30) Foreign Application Priority Data

Dec. 15, 2008 (JP) ................................. 2008-318080

(51) Int. Cl.
*G06F 12/00* (2006.01)
(52) U.S. Cl. .............................. 711/162; 714/6.1; 714/14
(58) Field of Classification Search .................. 711/162; 714/6.1, 14
See application file for complete search history.

(56) References Cited

U.S. PATENT DOCUMENTS

| | | | | |
|---|---|---|---|---|
| 6,044,444 A * | 3/2000 | Ofek | ............................ | 711/162 |
| 6,678,839 B2 * | 1/2004 | Mori | ............................ | 714/44 |
| 7,055,059 B2 * | 5/2006 | Yanai et al. | ................... | 714/6.32 |
| 7,240,238 B2 * | 7/2007 | Yanai et al. | ................... | 714/6.32 |
| 7,433,300 B1 * | 10/2008 | Bennett et al. | ................ | 370/216 |
| 7,809,983 B2 * | 10/2010 | Suzuki et al. | ................... | 714/14 |
| 8,006,056 B2 * | 8/2011 | Voigt et al. | ..................... | 711/165 |

FOREIGN PATENT DOCUMENTS

| JP | 2001-86146 | 3/2001 |
|---|---|---|
| JP | 2007-274153 | 10/2007 |

* cited by examiner

*Primary Examiner* — Stephen Elmore
(74) *Attorney, Agent, or Firm* — Staas & Halsey LLP

(57) ABSTRACT

A storage system, a storage managing device, and a storage managing method are provided. The storage system includes plural mount devices in which storage devices are mounted and includes a router connected to at least two loops in which plural mount devices are cascade-connected to one another, an initialization completion determining unit that determines whether an initialization processing of obtaining identification information of the storage devices is completed when the initialization processing concerned is executed by using at least one loop of the loops connected to the router, an initialization time determining unit that determines whether an execution time of the initialization processing elapses a predetermined time based on a determination result of the initialization completion determining unit, and a time extending unit that extends the predetermined time when the determination result indicates that the initialization processing completed and the initialization processing is executed by the plural loops.

10 Claims, 9 Drawing Sheets

\* CASCADE CONNECTION OF SIX STAGES
AT MAXIMUM IS POSSIBLE FOR DE

○: START LIP
●: AT THE DETECTION TIME OF OVERTIME OF LIP MONITORING TIME

STORAGE SYSTEM, STORAGE MANAGING DEVICE AND STORAGE MANAGING METHOD

CROSS-REFERENCE TO RELATED APPLICATION(S)

This application is related to and claims priority to application Japanese Patent Application No. 2008-318080, filed on Dec. 15, 2008, and incorporated herein by reference.

FIELD

The embodiments discussed herein are directed to a storage system for storing data, and a storage managing device and a storage managing method for managing the storage system.

BACKGROUND

Conventionally, a storage system is disclosed in which plural magnetic disk devices (the magnetic disk device will be hereinafter referred to as "disk") are mounted to accumulate a tremendous amount of data.

FIG. 1 illustrates a storage system 1000. The storage system illustrated in FIG. 1 aims to enhance redundancy of data by constructing RAID (Redundant Arrays of Independent (Inexpensive) Disks), thereby supplying a desired performance characteristic to a host.

The modules illustrated in FIG. 1 are described hereunder.

A CA (Channel Adapter) 200 is a module for controlling an interface to Host 202. When CA 200 receives a data Write/Read operation request from Host 202, CA 200 notifies a processing request to CM 203 (Centralized Module) or directly accesses Cache Memory on CM 203 to perform data transfer between CM 203 and Host 202.

CM is a module serving as a central core for the modules illustrated in FIG. 1. Firmware-mounted control modules such as a CACHE control module 201, a Backend control module 204, etc. exist in CM.

The CACHE control module 201 performs allocation management and entire control concerning a memory area in CM. The BackEnd control module has small modules for performing the control of Fibre Channel Interface for communicating with disks, I/O control of disks, the control of RAID constructed by plural disks, etc. Each control may be executed on the basis of FCMAP as a managing table. In FIG. 1, the module for performing the control of Fibre Channel Interface and the I/O control of disks is represented as FC/Disk Driver 205.

Furthermore, an FC controller, e.g., QX4 for communicating with disks may be mounted in CM.

BRT (BackEnd Router) is a module having a fabric function of supplying a communication path between CM and DE (Driver enclosure). BRT will be described with reference to FIG. 2.

Eight ports of interface to CM exist in BRT 206, and thus BRT can connect to eight CMs at maximum. Eight ports of interface for connecting to DE 207 exist in BRT, and thus BRT can connect to forty eight DEs (8 buses×6 cascades) at maximum. Eight BRTs at maximum are mounted in this storage system. Two BRTs are mounted with being paired at all times to make the bus to DE redundant.

The fabric is one system for connecting a target (a disk in this embodiment) and an initiator (CM in this embodiment) to each other, and it may be defined as a network using a fibre channel switch or a network in which fibre channel switches are mutually connected to each other. When the fabric function is mounted, it is unnecessary that the initiator and the target port are directly connected, and thus extendibility is excellent. Furthermore, when a command is transmitted, the transmission is performed through only a device having the fabric function, and thus the fabric function exercises a higher command processing performance as compared with an AL-PA system for connecting plural targets in a loop style.

Returning to the description of the internal modules of the storage system shown in FIG. 1, DE is a device having a disk mounted therein, and DE will be described with reference to FIG. 3. DE can be designed so that fifteen disks at maximum can be mounted per DE. DE has two PBCs 208 (Port Bypass Circuits) mounted thereon, and it can be cascade-connected to another DE through PBC. In the following description, DE connected directly to the initiator (BRT in this embodiment) will be referred to as basic DE and DE cascade-connected from the basic DE 209 will be referred to as "extended DE" 210 as necessary.

Two PBCs may be mounted per DE, and each PBC has FCC (Fibre Channel Controller) mounted therein and has a role of transferring an FC packet from CM to an indicated disk or from an indicated disk to CM.

The relative terms of the storage system will be described hereunder.

PLU is information representing a mount position of a disk in the system which is managed in CM, and it is represented by "DE No." and "Solt No.".

Loop ID is identification information of each device connected to FC loop which is a loop constructed by fibre channels. Each device connected to FC loop is allocated with an address inherent in the loop. This address is represented by AL_PA. AL_PA is not a serial numerical value, and thus it is difficult to be handled in some cases. Accordingly, logically serial numerical values are allocated to AL_PA. These serial numerical values are loop IDs.

In the storage system and the upstream modules, the position information of disks is handled in PLU. However, when a command is actually issued to a disk, loop ID which is paired with PLU indicated form FCMAP is used, and a command is issued to the disk.

FCMAP is a tabled list of information of disks connected to FC loop. FCMAP is created when LIP (Loop Initialize Primitive) occurs on FC loop. The following information may be stored in FCMAP.

Loop ID corresponding to PLU
Loop ID of FCC
others, information concerning disk.

LIP is initializing processing executed to recognize the identification information of a device connected to FC loop so that the device is usable. A LIP start command is issued from Loop Master (CM in this embodiment) onto FC loop, whereby LIP is executed. LIP is executed as needed when the construction is changed at each port (FC loop) in BRT.

The storage system discriminates the state of FC loop as follows.

Linkup
    LIP is completed, and thus it represents a state that the FC loop concerned is usable.
Under LIP
    LIP is being executed, and thus it represents a state that the FC loop concerned is unusable. Furthermore, in the case where LIP is not completed even when a fixed time elapses from the start time of the LIP processing (LIP Timeout), abnormality of hardware or the like may occur, and thus this storage system sets the corresponding port to an unusable state.

Linkdown

It represents a state that FC loop is unusable because LIP has not yet been completed.

When LIP simultaneously occurs in plural FC loops connected to the same BRT, the completion of LIP is delayed due to the limit of the processing performance of BRT.

Furthermore, when power failure occurs in extended DE, the storage system determines occurrence of power failure under the following conditions.

(1) LIP of DE in which power failure occurs is completed, and the state of the FC loop concerned is Linkup.

(2) When a disk mounted in power-failure occurring DE is accessed, the loop ID of the disk concerned is vanished in FCMAP.

(3) FCC mounted in the DE concerned is vanished from FCMAP.

However, when LIP occurs at plural ports (FC loop) connected to the same BRT due to power failure of the extended DE, it takes time due to the limit of the processing performance in BRT as described above until FC loop of power-failure occurring DE is set to Linkup. As a result, LIP is timeout, so that DE power failure cannot be determined in some cases.

When power failure can be detected, for example data on Cache could be temporarily evacuated into a disk (disk in basic DE) to thereby prevent data loss. However, when power failure cannot be detected, this action could not be performed.

The trouble operation described above will be described with reference to FIG. 4. The basic DE and the extended DE may be mounted in different racks, and the probability that extended DEs having the same number of cascade-connection stages may be mounted in the same rack increases due to the wire cable length although this is varied in accordance with the arrangement status of the storage system. Furthermore, each rack-mounted device is supplied with power from a common power supply unit of the rack. Accordingly, when power failure occurs, it should be noted that power is interrupted every rack. That is, the power supply to the respective devices mounted in the same rack is interrupted at the same time. In the example of FIG. 4, it is assumed that DEs grouped by a broken line 401 are mounted on one rack. Furthermore, it is assumed that a group indicated by a one-dotted chain line 402 are one FC loop. Main units may aggregate at one place to construct a system. When the system is constructed based on this policy, CM and the basic DE may be mounted in the same rack, and thus CM and the basic DE are supplied with power from a common power supply unit on the rack. As illustrated:

410: Power failure occurs in a rack in which an extended DE directly-connected to the basic DE is mounted.

420: Since power failure of DE occurs over plural FC loops, LIP occurs in the plural FC loops connected to BRT. The completion of LIP is sluggish (delayed) due to the limit of the processing performance of BRT.

430: As a result of the delay of the LIP completion, the overtime of the LIP monitoring time is detected, and LIP Timeout is set, so that the bus is closed.

440: CM tries to issue a command to a disk mounted in power-failure occurring DE. However, CM cannot determine that DE power failure occurs because the bus is closed in "3".

450: When power failure cannot be detected, it is impossible to access an accessible base DE, and thus data loss occurs (backup failure).

SUMMARY

It is an aspect of the embodiments discussed herein to provide a storage system for storing data, a storage managing device and a storage managing method for managing the storage system.

The above aspects can be attained by a storage system having plural mount devices in which storage devices are mounted includes, a router connected to at least two loops in which plural mount devices are cascade-connected to one another, an initialization completion determining unit that determines whether an initialization processing of obtaining identification information of the storage devices is completed when the initialization processing concerned is executed by using at least one loop of the loops connected to the router, an initialization time determining unit that determines whether an execution time of the initialization processing elapses a predetermined time based on a determination result of the initialization completion determining unit, and a time extending unit that extends the predetermined time when the determination result of the initialization time determining unit indicates that the initialization processing completed and the initialization processing is executed by the plural loops connected to the router.

These together with other aspects and advantages which will be subsequently apparent, reside in the details of construction and operation as more fully hereinafter described and claimed, reference being had to the accompanying drawings forming a part hereof, wherein like numerals refer to like parts throughout.

The object and advantages of the invention will be realized and attained by may be defined as of the elements and combinations particularly pointed out in the claims.

It is to be understood that both the foregoing general description and the following detailed description are exemplary and explanatory and are not restrictive of the invention, as claimed.

DETAILED DESCRIPTION OF THE EMBODIMENTS

In an exemplary embodiment, in a storage system of this embodiment, LIP may occur at each port of BRT, that is, FC loop when power failure occurs in extended DE. When occurring LIP has not been completed in a fixed period of time, the storage system checks whether LIP occurs at another port of the same BRT. When LIP occurs at another port, the storage system may extend the LIP monitoring time and waits for the completion of LIP because power failure may occur in DE, whereby separation (close) of BRT port and failure of Backup due to LIP Timeout can be prevented.

Figure 5:
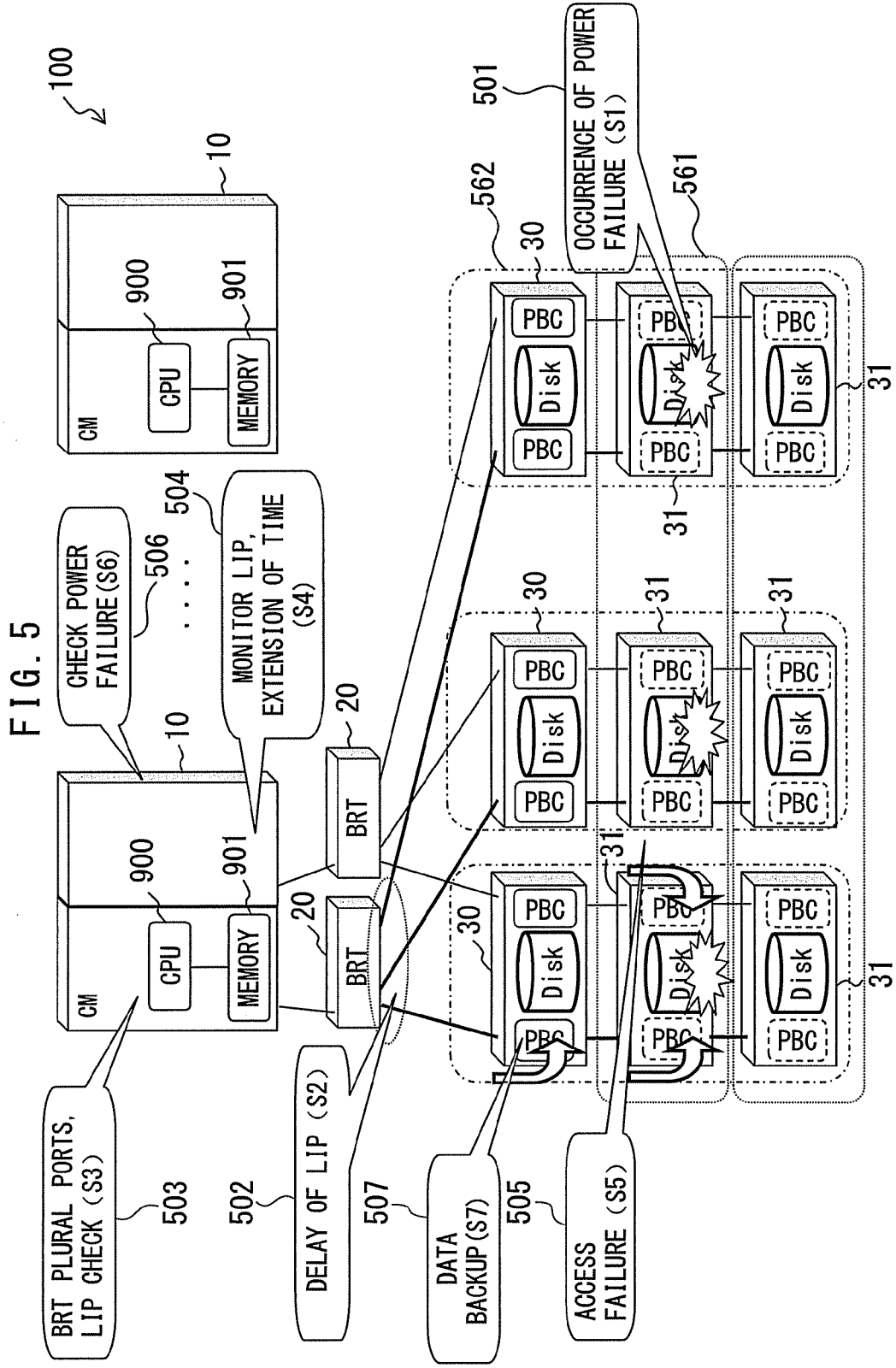
FIG. 5 illustrates an exemplary storage system according to an embodiment.

FIG. 5 illustrates an exemplary storage system according to this embodiment. The storage system 100 includes CM 10, BRT 20 (router device), and basic DE 30 and extended DE 31

(mount device) in which at least one disk (storage device) may be mounted. CM 10 includes CPU (Central Processing Unit) 900 as a central processing unit, and a memory 901 as a volatile/non-volatile storage device.

The operation of the storage system 100 will be described with reference to FIG. 5. In FIG. 5, it may be assumed that DEs grouped by a broken line 561 may be mounted in one rack. It may be assumed that the group indicated by one-dotted chain line 562 constructs one FC loop.

When power failure occurs in plural extended DEs 31 (S1) 501, LIP occurs at plural ports of BRT 20 (that is, FC loop). Due to the limit of the processing performance of BRT 20, the completion of LIP is sluggish (delayed) (S2) 502.

As a result of the delay of the completion of LIP, the overtime of the LIP monitoring time is detected. In this case, when the overtime of the LIP monitoring time is detected, CM 10 checks whether LIP occurs in plural ports of the same BRT (S3) 503. Since LIP occurs in the plural ports, power failure may occur in the extended DE 31. Therefore, CM 10 extends the LIP monitoring time (S4) 504 and LIP is completed after a while.

When a user using the storage system 100 accesses a disk mounted in power-failure occurring extended DE 31 for data read/write, CM 10 tries to access the Disc concerned. However, LIP is completed, but the loop ID of the disk concerning does not exist because of power failure, so that the access fails (S5) 505.

CM 10 suspects that power failure occurs in DE 31, and checks whether FCC of the extended DE 31 having the disk concerned mounted therein exists on FCMAP. When CM 10 confirms that FCC vanishes, CM 10 determines that power failure occurs in DE (S6) 506.

CM 10 which detects the power failure evacuates data on Cache (for example, when the access from the user is a write request, the data of the writing content) to a disk mounted in an accessible DE (S7) 507. In this embodiment, the accessible DE is the basic DE 30 which may be mounted in the same rack as CM 10 with high probability for the above reason, and CM 10 evacuates the data on Cache into the disk in the basic DE 30.

Figure 6:
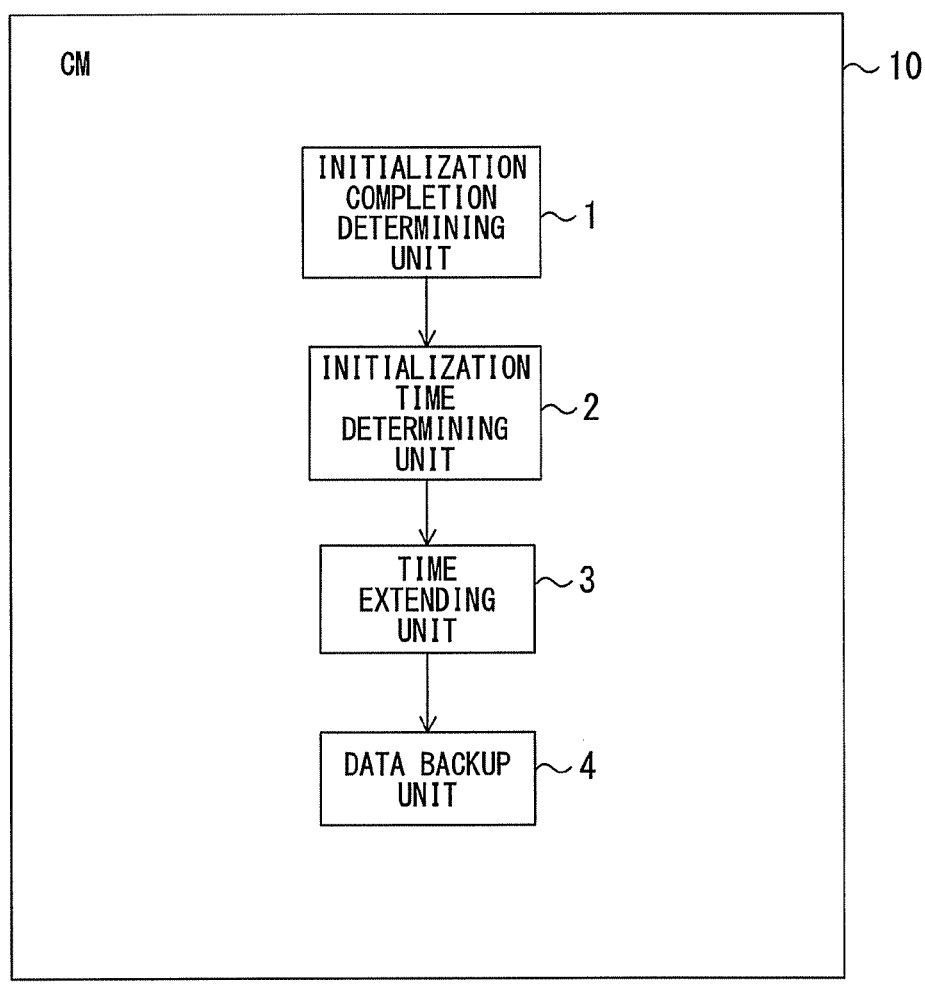
FIG. 6 illustrates an CM according to an embodiment.

FIG. 6 illustrates an en exemplary embodiment of CM 10. CM 10 includes an initialization completion determining unit 1, an initialization time determining unit 2, a time extending unit 3 and a data backup unit 4. These operations may be implemented by fetching firmware which is held in the memory 901 in advance, and cooperating the firmware with respective hardware resources such as CPU 900, the memory 901, etc.

When LIP as the processing of obtaining the identification information of each disk is executed in at least one FC loop out of FC loops connected to BRT 20, the initialization completion determining unit 1 determines whether LIP is completed.

When the determination result of the initialization completion determining unit 1 is "NO", the initialization time determining unit 2 determines whether the execution time of the initialization processing elapses a predetermined time.

The time extending unit 3 extends the above predetermined time when the determination result of the initialization time determining unit 2 is "NO" and LIP is executed in plural loops connected to BRT 20.

When a write access to a disk from which no identification information is obtained occurs after LIP is completed and the write access fails, the data backup unit 4 holds the write access data concerned into a disk in DE different from the DE having the disk from which no identification information is obtained.

The initialization completion determining unit 1, the initialization time determining unit 2, the time extending unit 3 and the data backup unit 4 may be installed in the Backend control module are disclosed.

An exemplary operation of the time extending unit 3 is disclosed.

When LIP occurs at plural ports of BRT, LIP has not yet been completed although a fixed time elapses and thus the overtime of the time monitoring time is detected, the time extending unit 3 determines on the basis of the hold contents of a LIP occurrence status check BITMAP and a LIP extension BITMAP described later whether LIP should be extended. When the time extending unit 3 determines that the extension of LIP is necessary, the time extending unit 3 monitors the completion of LIP at a fixed time interval and extends the monitoring time.

Figure 7:
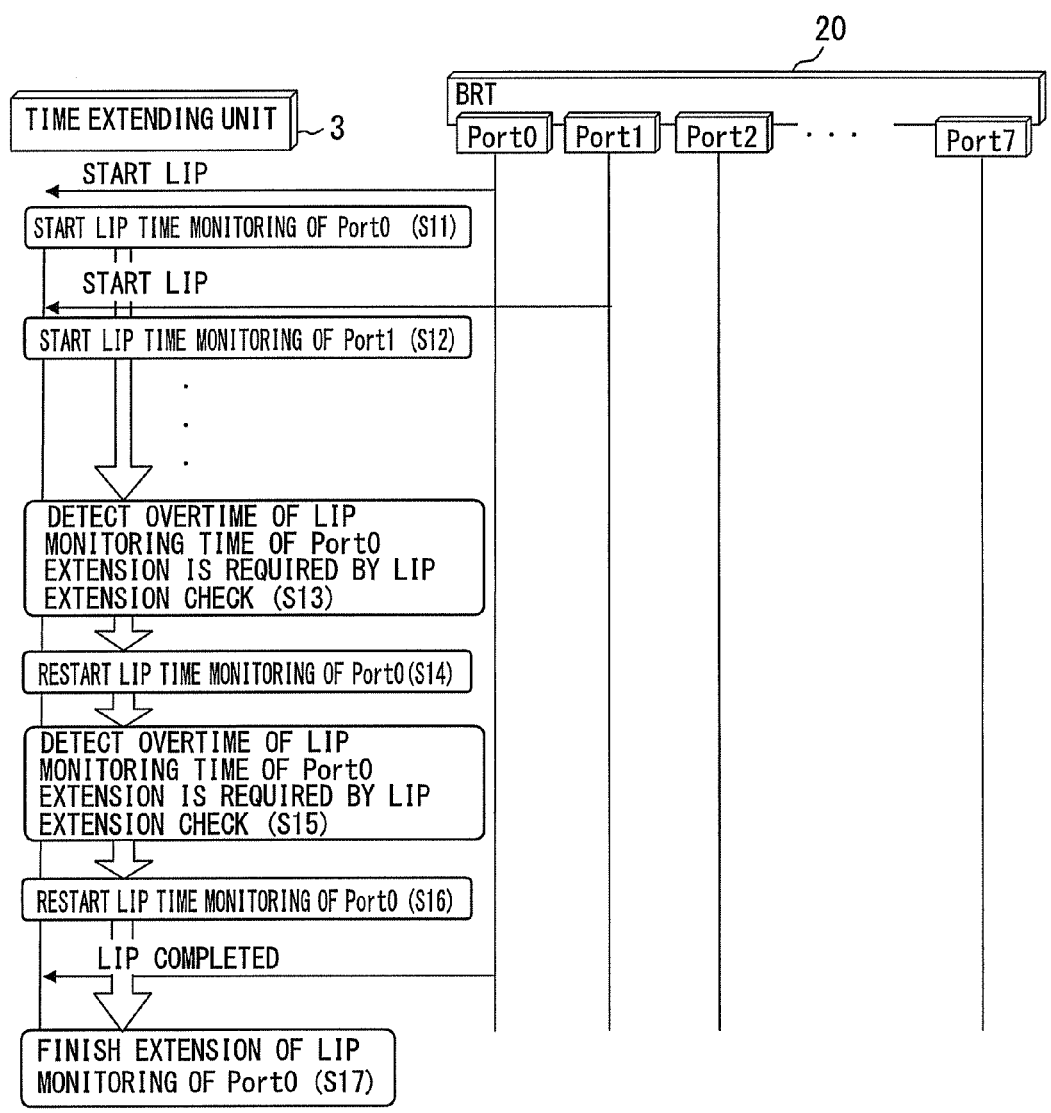
FIG. 7 illustrates an exemplary operation of a time extending unit when plural LIPs occur in BRT according to the embodiment.

An exemplary operation of the time extending unit 3 when LIP occurs in each port of BRT 20 is illustrated in FIG. 7 and described.

When LIP occurs in any port (port0 in the example of FIG. 7), the time extending unit 3 starts LIP time monitoring to the port0(S11). Subsequently, when LIP occurs in another port (port1 in the example of FIG. 7), the time extending unit 3 starts LIP time monitoring to the port1 (S12). When the overtime of the LIP monitoring of the port0 is detected and by the LIP extension check (described later) based on the hold contents of the LIP occurrence status check BITMAP and the LIP extension BITMAP, the time extending unit 3 determines that the extension is necessary (S13), the LIP time monitoring of the port0 is restarted (S14).

[When the overtime of the LIP monitoring of the port0 is detected again and the time extending unit 3 determines through the LIP extension check that the extension is necessary, the LIP time monitoring of the port0 is further started (S15, S16).

When LIP is completed, the extension of the LIP monitoring of the port0 is finished (S17).

Figure 1:
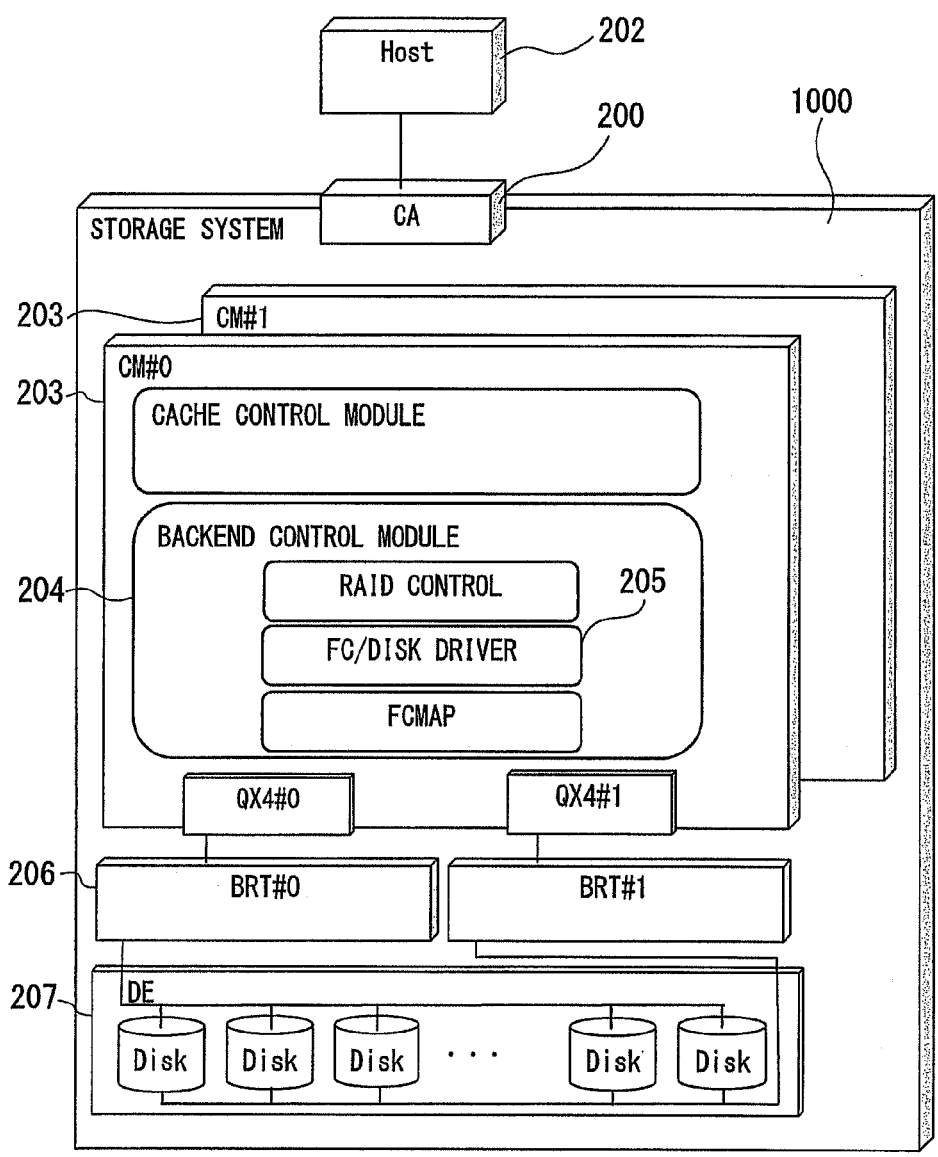
FIG. 1 illustrates a storage system.
Figure 2:
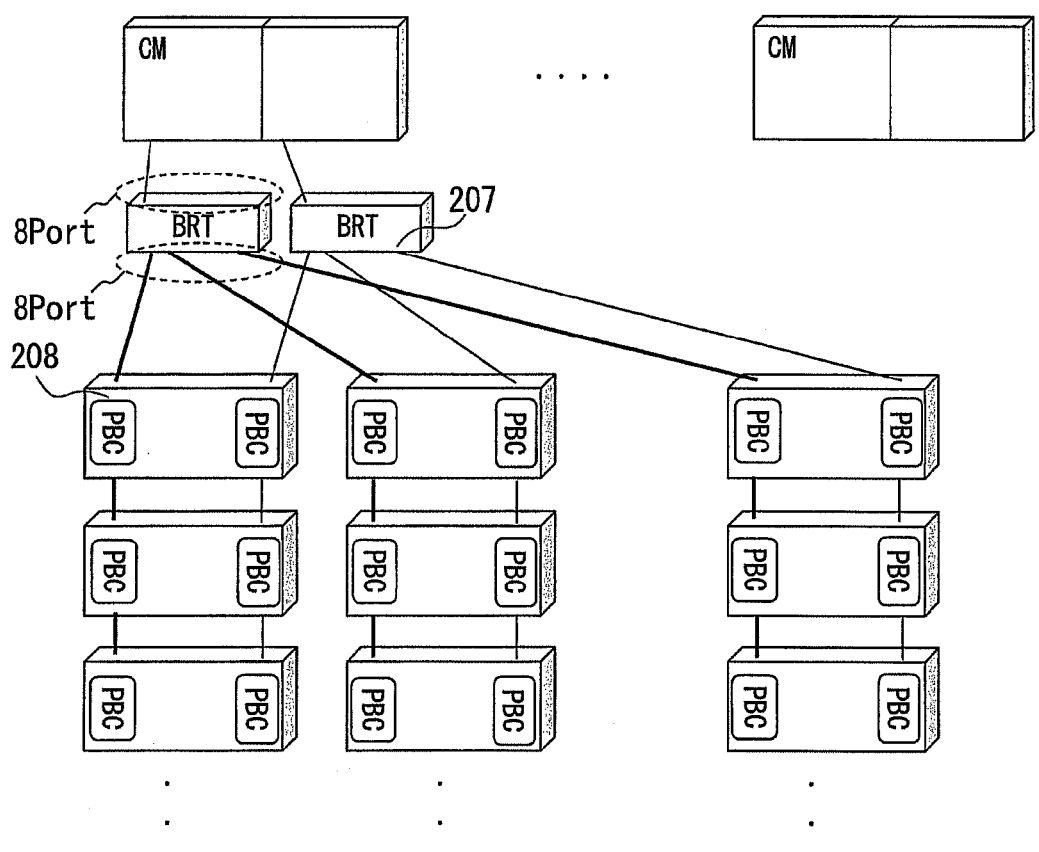
FIG. 2 illustrates a BRT.
Figure 3:
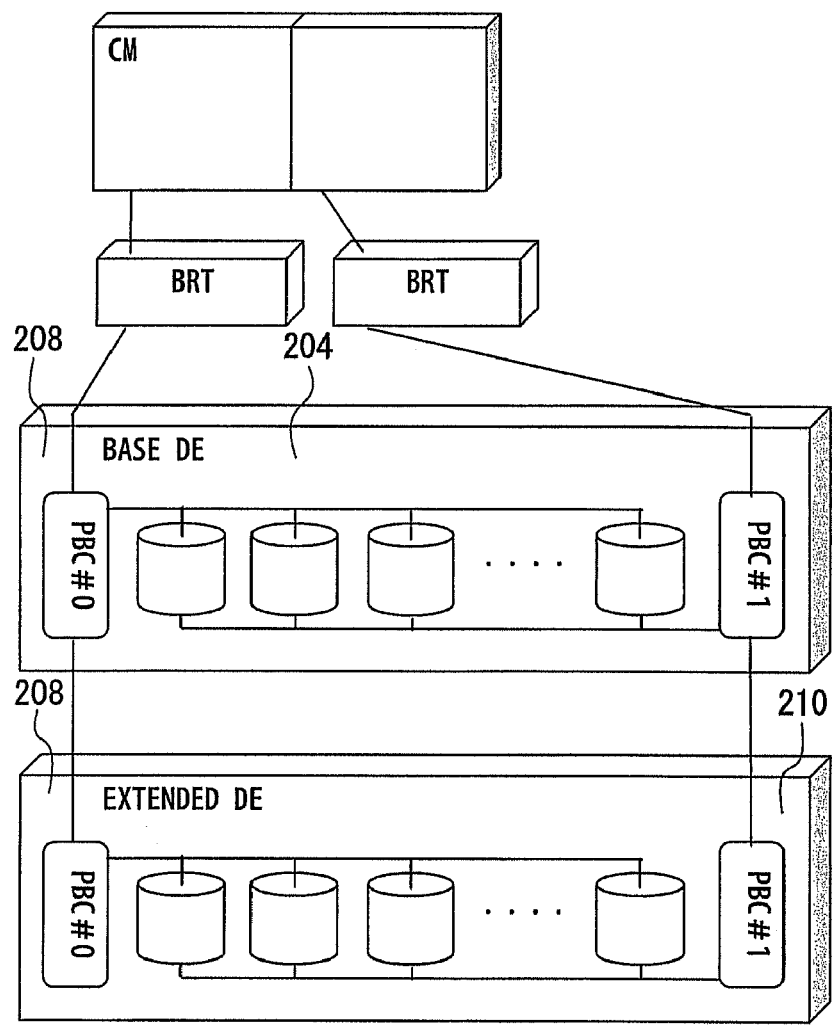
FIG. 3 illustrates a DE.
Figure 4:
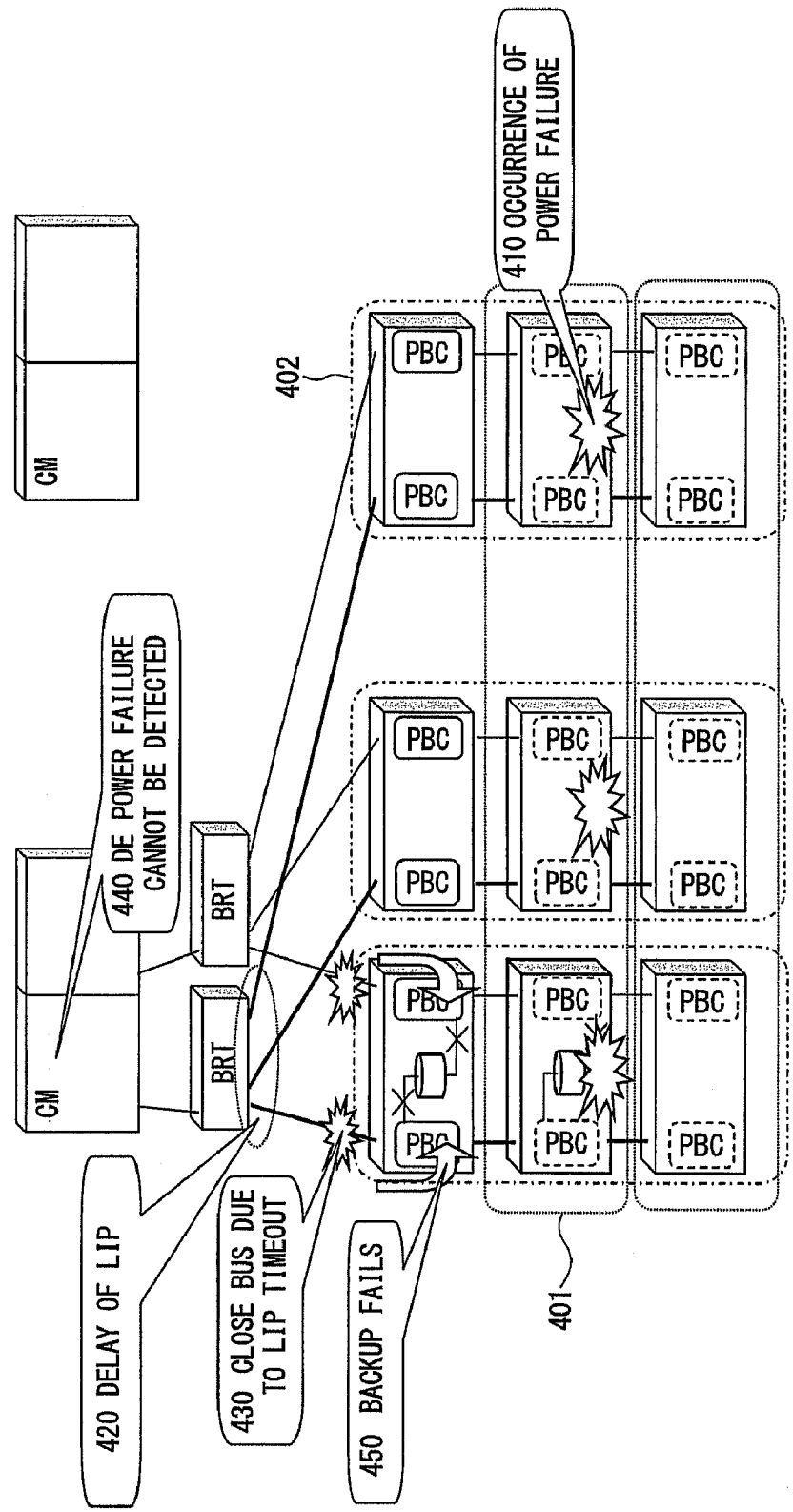
FIG. 4 illustrates a problem point when power failure occurs in extended DE of the storage system.

The BITMAP used in the LIP extension processing will be described with reference to FIG. 4. In this embodiment, two BITMAPs of LIP occurrence status check BITMAP (see FIG. 8A) and LIP extension BITMAP (see FIG. 8B) may be used for the processing of LIP extension.

The LIP occurrence status check BITMAP and the LIP extension BITMAP will be described hereunder. These BITMAPs are assumed to be held in the memory 901. Furthermore, these BITMAPs may be installed in FCMAP described above.

The LIP occurrence status check BITMAP is a bitmap for checking whether LIP occurs in each port of BRT. The value of each bit may be defined as "under LIP" in the case of "1", and may be defined as "other cases than "under LIP"" in the case of "0". With respect to the LIP occurrence status check BITMAP, a memory area of 8 bytes, that is, 64 bits is newly provided on the memory 901 to manage ports (64 at maximum) of BRT when the maximum number of ports are constructed in the system. This area is held every CM.

Figure 8A:
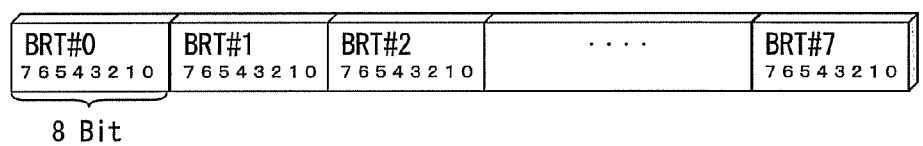
FIGS. 8A-8C illustrate treatment of each BITMAP when a LIP occurrence status check BITMAP, LIP extension BITMAP and plural LIPs according to the embodiment occur.

FIG. 8A illustrates the format of the LIP occurrence status check BITMAP. When LIP occurs, the bit corresponding to the port concerned is set to 1. When LIP is completed, the bit corresponding to the port concerned is set to 0.

The LIP extension BITMAP is a bitmap for indicating every BRT whether LIP extension is necessary. The value of each bit may be defined as "LIP extension is necessary" in the case of "1", and may be defined as "LIP extension is unnecessary" in the case of "0". With respect to the LIP extension BITMAP, a memory area of 1 byte, that is, 8 bits is newly provided on the memory 901 to manage BRTs (8 at maximum) when the maximum number of BRTs are constructed in the system. This area is held every CM.

Figure 8B:
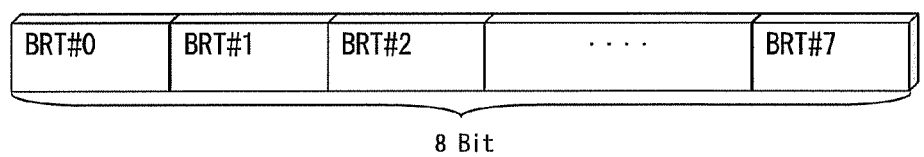

FIG. 8B illustrates the format of the LIP extension BITMAP. At the LIP start time, it is checked from the flag of the LIP occurrence status check BITMAP whether LIP occurs at plural ports under the same BRT. As a result, when it is determined that LIP occurs at the plural ports under the same BRT, the LIP extension flat of the BRT concerned is set to 1.

At the timing at which initial LIP occurs under BRT, the LIP extension flag of the BRT concerned is set to 0. For example, when LIP occurs after a predetermined time elapses from the occurrence time of previous LIP, the LIP concerned is set as the initial LIP. When the overtime of the LIP monitoring is detected, this BITMAP is referred to, and LIP is extended when the LIP extension flag is set to 1.

Figure 8C:
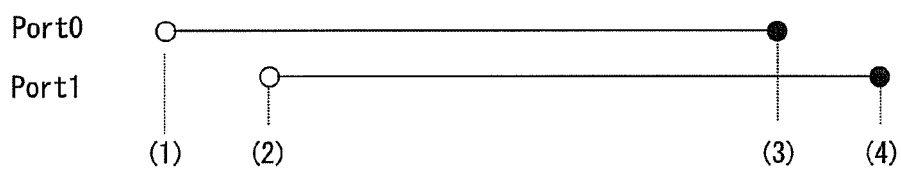

[A case where plural LIPs occur at ports under some BRT will be described with reference to FIG. 8C. In FIG. 8C, the horizontal direction is set to a time axis.

It may be assumed that LIP occurs at a port, for example, port0 under some BRT ((1) of FIG. 8C). The flag of the LIP occurrence status check BITMAP under the BRT concerned is checked, and it is determined that initial LIP occurs at the port under the BRT concerned. Therefore, the flag of the LIP extension BITMAP of the BRT concerned is set to 0.

It may be assumed that LIP occurs at another port, for example port1 under the BRT described above ((2) of FIG. 8C). The flag of the LIP occurrence status check BITMAP under the BRT concerned is checked. LIP has already occurred at the port0 under the BRT concerned, and thus the flag of the LIP extension BITMAP of the BRT concerned is set to 1.

When the overtime of the monitoring of the port0 is detected ((3) of FIG. 8C), the flag of the LIP extension BITMAP of the BRT concerned is referred to. Since the flag of the LIP extension BITMAP is set to 1, the LIP extending processing on the port0 is executed. The same is also applied when the overtime of the monitoring of the port1 is detected ((4) of FIG. 8C).

Figure 9:
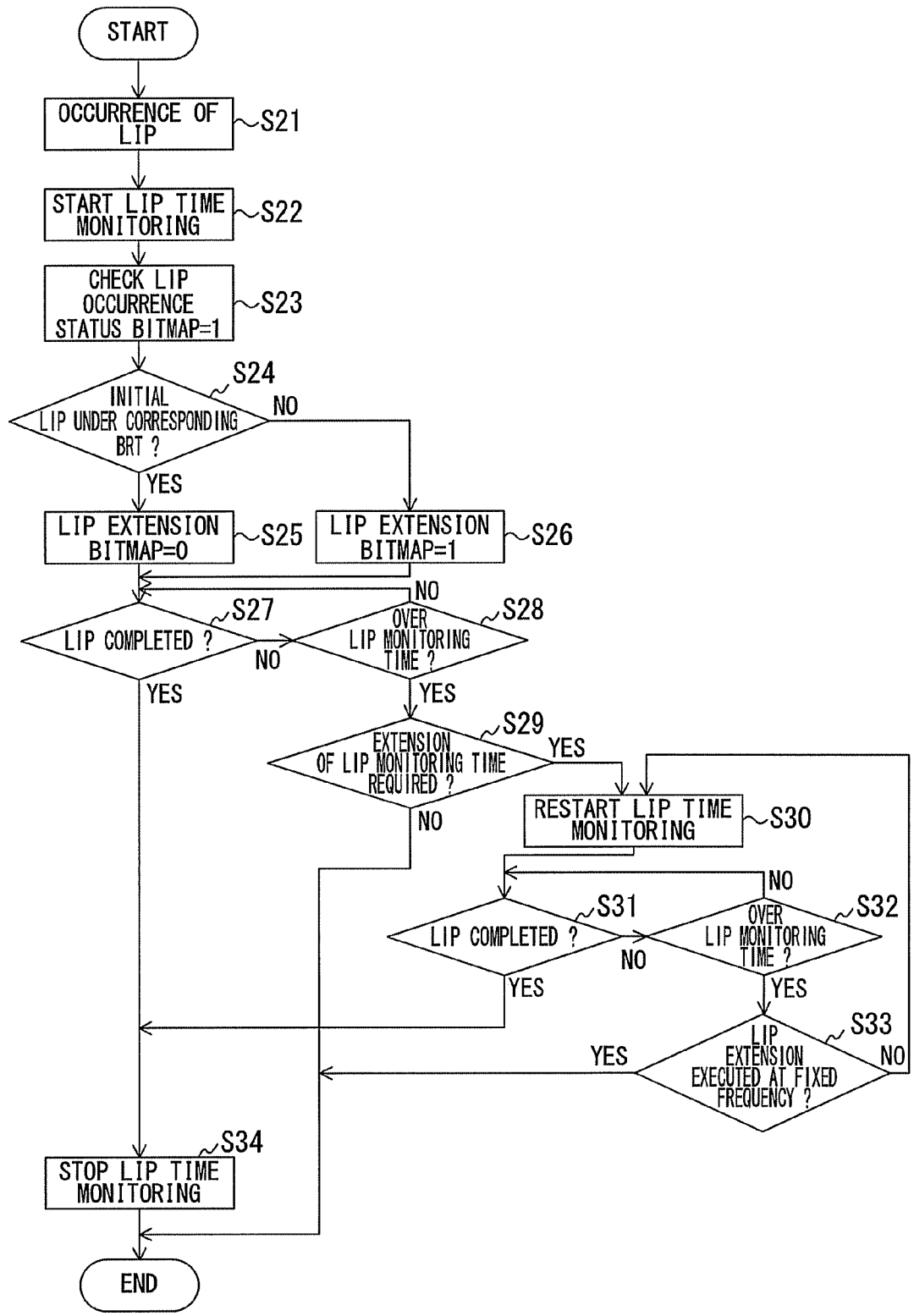
FIG. 9 illustrates operation of CM according to the embodiment.

An exemplary operation of CM 10 will be described with reference to FIG. 9.

When power failure occurs in DE 31 and LIP occurs (S21), the initialization time determining unit 2 measures a LIP execution time for performing the determination processing as to whether the monitoring time of LIP, that is, the LIP execution time elapses a predetermined time (S22). The time extending unit 3 sets the bit corresponding to LIP-occurring port in the BRT concerned to 1 on the LIP occurrence status check BITMAP (S23), and determines whether the LIP occurring under the BRT concerned is an initial LIP (S24). The time extending unit 3 determines whether 1 has been already set to another bit in the same BRT on the LIP occurrence status check BITMAP. When 1 is not set, the time extending unit 3 determines that the LIP concerned is the initial LIP. When 1 is set, the time extending unit 3 does not determine that the LIP concerned is not the initial LIP.

When the LIP concerned is the initial LIP (S24, Yes), the time extending unit 3 sets 0 to the bit corresponding to the BRT concerned of the LIP extension BITMAP (S25). On the other hand, when the LIP concerned is not the initial LIP (S24, No), the time extending unit 3 sets 1 to the bit corresponding to the BRT concerned of the LIP extension BITMAP (S26).

The initialization completion unit 1 determines whether LIP is completed (S27). When LIP is completed (S27, Yes), the initialization time determining unit 2 stops the time monitoring of the LIP, that is, the measurement of the LIP execution time started in S22 (S34), and finishes the processing.

On the other hand, when LIP is not completed (S27, No), the initialization time determining unit 2 determines whether the time elapses the LIP monitoring time, that is, the LIP execution time elapses a predetermined preset time (S28). When the execution time of LIP is over the monitoring time (S28, YES), the time extending unit 3 determines whether the extension of the LIP monitoring time is necessary (S29). When the bit corresponding to the BRT concerned of the LIP extension BITMAP is set to 1, the time extending unit 3 determines that the extension is necessary, and when the bit concerned is set to 0, the time extending unit 3 determines that the extension is unnecessary.

When it is determined that the extension is unnecessary (S29, No), the processing is finished without taking any action. On the other hand, when it is determined that the extension is necessary (S29, Yes), the time extending unit 3 extends the monitoring time as a predetermined time, and re-starts the LIP time monitoring (S30).

The initialization completion determining unit 1 determines again whether LIP is completed (S31). When LIP is completed (S31, Yes), the initialization time determining unit 2 stops the time monitoring of LIP, that is, the measurement of the LIP execution time started in S22 (S34), and then finishes the processing.

On the other hand, when LIP is not completed (S31, No), the initialization time determining unit 2 determines whether the time is over the LIP monitoring time (S32) as in the case of S28. When the LIP execution time is over the monitoring time (S32, Yes), the time extending unit 3 determines whether the LIP extension is executed at a predetermined fixed number of times (S33). When the LIP extension frequency exceeds the fixed number of times (S33, Yes), the processing is finished, and the LIP concerned is treated as LIP Timeout. On the other hand, when the LIP extension frequency does not exceed the fixed number of times (S33, NO), the time extending unit 3 executes the processing of S30 again.

[When the determination result of S28 is No, the processing returns to the processing of S27. When the determination result of S32 is No, the processing returns to the processing of S31. In this loop, the processing is set to an interrupt waiting state of the LIP completion or the overtime of the LIP monitoring.

When LIP is completed and the Disk of the port concerned vanishes, the data backup unit 4 backs up data as indicated in S7 of FIG. 5. That is, when a write access to a disk from which no identification information is obtained occurs after the completion of LIP and the write access concerned fails, the data backup unit 4 holds the data of the write access into a disk mounted in a DE different from the DE concerned. In this embodiment, the data backup unit 4 holds data in a disk mounted in the basic DE 30. However, the data may be held in any disk which can be accessed at this stage. For example, with respect to extended DE 31, when a special area dedicated to backup is secured or when an external magnetic disk device dedicated to backup is prepared, the data of the failed write access may be evacuated to these storage areas. Furthermore, these evacuation areas may be indicated by a user. In this case, the evacuated data may be returned to be written into a normal area in which the data should be originally written, and thus the data backup unit 4 makes the memory 901 hold which place the data are evacuated to.

According to this embodiment, when power failure occurs in extended DE (on a rack basis), the power failure is more accurately detected, and user data and control information in the device can be prevented from being extinguished.

All The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A storage system having plural mount devices in which storage devices are mounted, comprising:
    a router device that is connected to at least two loops in which plural mount devices are cascade-connected to one another;
    an initialization completion determining unit that determines whether an initialization processing of obtaining identification information of the storage devices is completed when the initialization processing concerned is executed by using at least one loop of the loops connected to the router device;
    an initialization time determining unit that determines whether an execution time of the initialization processing elapses a predetermined time based on a determination result of the initialization completion determining unit; and
    a time extending unit that extends the predetermined time when the determination result of the initialization time determining unit indicates that the initialization processing is not completed and the initialization processing is executed by the plural loops connected to the router device.

2. The storage system according to claim 1, further comprising a data backup unit, wherein when a write access to a storage device from which no identification information is obtained occurs after the initialization processing is completed and the write access concerned fails, the data backup unit holds the data of the write access into a storage device in a mount device different from the mount device having the storage device from which no identification information is obtained.

3. The storage system according to claim 1, wherein when the initialization processing is executed by the plural loops connected to the router device, the time extending unit determines that power supply interruption occurs in the mount device, and extends the predetermined time to avoid detection of the power supply interruption.

4. A managing device for a storage system comprising:
    an initialization completion determining unit that determines whether an initialization processing of obtaining identification information of a storage devices is completed when the initialization processing concerned is executed in at least one loop of plural loops in which plural mount devices having storage devices mounted therein are cascade-connected to one another;
    an initialization time determining unit that determines whether an execution time of the initialization processing elapses a predetermined time based on a determination result of the initialization completion determining unit; and
    a time extending unit that extends the predetermined time when the determination result of the initialization time determining unit indicated that the initialization processing is not completed and the initialization processing is executed by the plural loops.

5. The storage managing device according to claim 4, further comprising a data backup unit, wherein when a write access to a storage device from which no identification information is obtained occurs after the initialization processing is completed and the write access concerned fails, the data backup unit holds the data of the write access into a storage device in a mount device different from the mount device having the storage device from which no identification information is obtained.

6. The storage managing device according to claim 4, wherein when the initialization processing is executed by the plural loops, the time extending unit determines that power supply interruption occurs in the mount device, and extends the predetermined time to avoid detection of the power supply interruption.

7. The storage managing device according to claim 4, wherein when the initialization processing is executed by the plural loops, the time extending operation determines that power supply interruption occurs in the mount device, and extends the predetermined time to avoid detection of the power supply interruption.

8. A storage managing method comprising:
    an initialization completion determining operation of determining whether an initialization processing of obtaining identification information of a storage devices is completed when the initialization processing concerned is executed in at least one loop of plural loops in which plural mount devices having storage devices mounted therein are cascade-connected to one another;
    an initialization time determining operation of determining whether an execution time of the initialization processing elapses a predetermined time based on a determination result of the initialization completion determining operation; and
    a time extending operation of extending the predetermined time when the determination result of the initialization time determining operation indicates that the initialization processing is not completed and the initialization processing is executed by the plural loops.

9. The storage managing method according to claim 8, further comprising a data backup operation, wherein when a write access to a storage device from which no identification information is obtained occurs after the initialization processing is completed and the write access concerned fails, the data backup operation holds the data of the write access into a storage device in a mount device different from the mount device having the storage device from which no identification information is obtained.

10. A storage system comprising:
- a router device connectable to at least two loops in which devices are cascade-connected to one another;
- a determining unit capable of determining whether an initialization processing is completed by using at least one loop of the loops and whether an execution time of the initialization processing is greater than a predetermined time; and
- a time extending unit that extends the predetermined time when the initialization processing is not completed and the initialization processing is executed by the plural loops connected to the router device.

* * * * *